United States

Allan et al.

[11] 3,939,345

[45] Feb. 17, 1976

[54] LIQUID CRYSTAL IMAGING OF RADIOGRAMS

[75] Inventors: Frank V. Allan, Los Angeles; John B. Fenn, Jr., Canoga Park; Murray S. Welkowsky, Sherman Oaks, all of Calif.

[73] Assignee: Xonics, Inc., Van Nuys, Calif.

[22] Filed: Dec. 23, 1974

[21] Appl. No.: 536,922

[52] U.S. Cl..... 250/315 A; 250/315 R; 350/160 LC
[51] Int. Cl.² .......................................... G03B 41/16
[58] Field of Search ............... 250/315, 315 A, 320; 350/160 LC

[56] References Cited
UNITED STATES PATENTS

| | | | |
|---|---|---|---|
| 3,484,752 | 12/1969 | Kallmann | 250/315 A |
| 3,774,029 | 11/1973 | Muntz et al. | 250/315 A |
| 3,804,618 | 4/1974 | Forest et al. | 350/160 LC |
| 3,829,684 | 8/1974 | Assouline et al. | 350/160 LC |
| 3,873,833 | 3/1975 | Allan et al. | 250/315 A |

*Primary Examiner*—Archie R. Borchelt
*Assistant Examiner*—B. C. Anderson
*Attorney, Agent, or Firm*—Harris, Kern, Wallen & Tinsley

[57] ABSTRACT

An electronradiography imaging chamber providing a visual image at the chamber suitable for direct viewing and/or copying. An imaging chamber with a first electrode on the x-ray source side, an x-ray absorber in a gap between the first electrode and an anisotropic plate, and a liquid crystal material in a second gap between the plate and a second transparent electrode, with incoming x-radiation providing a charge image on the plate at the absorber gap, with the plate transferring the charge image to the liquid crystal side and modulating the liquid crystal material to produce a visual image of the charge image, which visual image is viewable through the second electrode.

13 Claims, 3 Drawing Figures

LIQUID CRYSTAL IMAGING OF RADIOGRAMS

BACKGROUND OF THE INVENTION

This invention relates to electronradiography and in particular, to a new and improved imaging chamber for providing directly viewable and copyable images. The conventional electronradiography system has an x-ray absorber and electron and positive ion emitter in a gap between electrodes. Incoming radiation is absorbed in the gap and the emitted electrons and positive ions are attracted toward the corresponding electrodes. A dielectric receptor sheet is positioned at one or both of the electrodes and electrostatic charge images are formed on the receptor sheets. The receptor sheet is removed from the imaging chamber and the electrostatic charge image is developed into a visual image by application of toner particles following conventional xerographic techniques. This results in a hard copy x-ray image which closely resembles the conventional x-ray film transparency. An electronradiography system utilizing gas as the absorber is shown in U.S. Pat. No. 3,774,029. An electronradiography system utilizing liquid absorber is shown in copending application Ser. No. 456,532, filed Apr. 1, 1974, now U.S. Pat. No. 3,873,833 and assigned to the same assignee as the present application.

The conventional electronradiography machine which produces the hard copy requires a number of moving parts for loading the receptor sheet into the imaging chamber and transferring the receptor sheet to developing and fixing stations, and also utilizes consumables which are replaced at intervals.

It is an object of the present invention to provide a new and improved electronradiography system for producing a directly viewable image at the imaging chamber utilizing the charge image while omitting the receptor sheet and its attendant handling requirements. The visual image may be viewed directly, may be photographed, and may be recorded electronically for transmission and/or storage. Such an imaging chamber requires no moving parts nor any consumable materials.

SUMMARY OF THE INVENTION

The imaging chamber of the present invention utilizes a pair of electrodes and an x-ray absorber and electron and positive ion emitter, as in the conventional electronradiography system. An anisotropic conductive plate is positioned between the electrodes defining a first gap between the first electrode and the plate for the x-ray absorber, and a second gap between the plate and second electrode for a liquid crystal material. Conventional liquid crystal materials may be utilized and both dynamic scattering type and field effect type are suitable. The second electrode is transparent and in operation, the charge image formed at the anisotropic conductive plate by the incoming radiation is transferred through the plate to the liquid crystal material modulating the material and producing a visual image viewable through the transparent second electrode, which corresponds to the charge image at the plate.

DESCRIPTION OF THE PREFERRED EMBODIMENT

Figure 1:
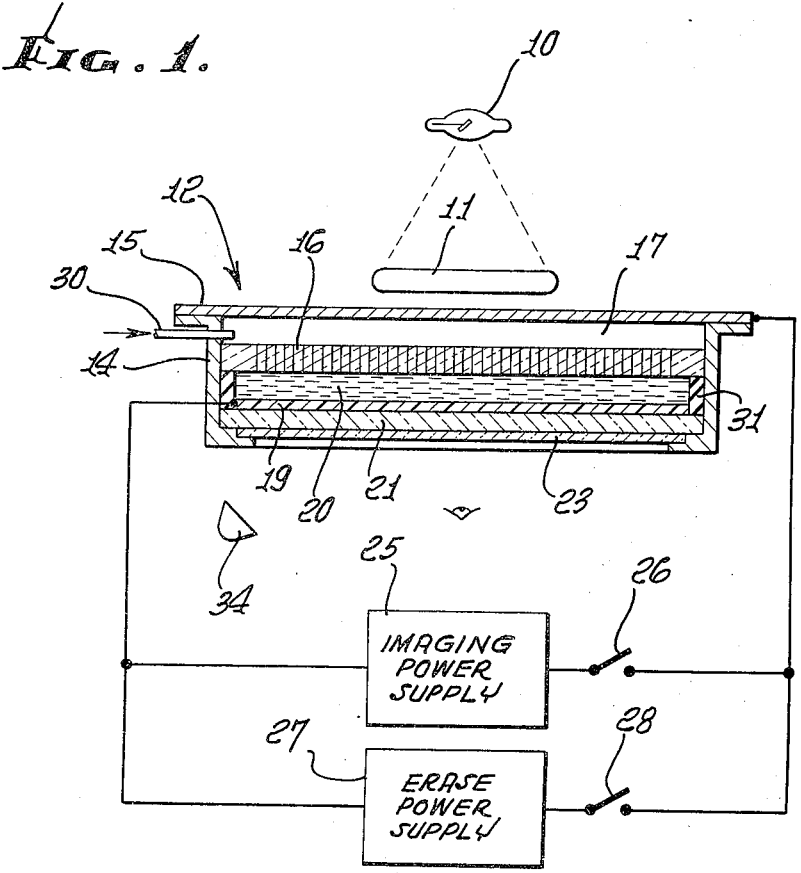
FIG. 1 is a diagrammatic illustration of an electronradiography system with an imaging chamber incorporating the presently preferred embodiment of the invention with a gas x-ray absorber.

In the electronradiography system of FIG. 1, an x-ray source 10 directs radiation through a body 11 to an imaging chamber 12. The imaging chamber includes a housing 14 with a cover 15 which serves as one electrode. An anisotropic plate 16 is positioned in the housing 14 defining a gap 17 between the electrode 15 and plate 16. Another electrode 19 is positioned in the housing defining another gap 20 between the plate and electrode 19. The electrode 19 should be transparent and typically may comprise a thin film conductor on a transparent substrate, such as a tin oxide film on a glass substrate 21.

In the embodiment of FIG. 1, a gas is maintained in the gap 17 at super atmospheric pressure and a high pressure viewing port is provided in the housing 14 with a window 23. An imaging power supply 25 is connected across the electrodes 15, 19 by a switch 26, and an erase power supply 27 may also be connected across the electrodes by another switch 28. An imaging gas may be introduced into the gap 17 via a line 30. A liquid crystal material is positioned in the gap 20 and a gasket 31 may be utilized for sealing purposes.

The imaging gas in a gap 17 functions as an x-ray absorber and electron and positive ion emitter and has an atomic number of at least 36, Xeon being a suitable gas. Reference may be made to the aforementioned U.S. Pat. No. 3,774,029 for further information on the imaging gas and its function. Any of the available, suitable liquid crystal materials may be utilized in the gap 20 and in the embodiment illustrated, a dynamic scattering type is preferred. The anisotropic plate 16 provides for electrostatic charge conduction from one surface of the plate to the other surface, with the plate separating the x-ray absorbing medium from the liquid crystal material. Typically, the anisotropic plate may be a pin matrix, such as an array of electrically conductive wires disposed parallel to and spaced from each other in a glass body, with the pins extending from one surface to the opposite surface. Thus, an electrostatic charge pattern or image produced at one surface of the plate will be reproduced at the opposite surface of the plate with the fidelity or accuracy limited only by the number of conducting pins. Pin matrices may be produced with the number of electrical conductors exceeding 10 per linear milimeter, providing a minimum resolution of 10 line pairs per milimeter.

In operation, the imaging power supply 25 is connected across the electrodes by the switch 26 and the x-ray source is energized. The radiation from the x-ray source entering the gap 17 is absorbed, resulting in generation of electrons and positive ions which move toward the electrode 15 and the plate 16, with the direction depending upon the polarity of the supply. An electrostatic charge image is formed on the upper surface of the plate 16 and is transferred through the plate to the lower surface. This charge then modulates the liquid crystal material producing a image which is viewable through the transparent electrode 19. A light source 34 may be directed toward the window 23 for improving the image if desired. This visual image may be viewed by the operator, may be photographed, and may be electronically copied for storage and/or transmission.

In the case of the dynamic scattering type of liquid crystal material, the passage of an electric current through a thin layer of initially well oriented material breaks up the single crystal structure into a multitude of randomly oriented, rapidly moving domains, which scatter light from their boundaries. The dynamic scattering will vary in intensity with the magnitude of the current traversing the liquid crystal. In this way, a gray scale will be produced in the visual image. Preferably, the ends of the conductive pins in the matrix of the anisotropic plate 16 will be polished so that they reflect much of the scattered light producing an image with good contrast.

Normally the imaging power supply will be switched off when the x-ray exposure terminates. Then the liquid crystal material will begin to relax back to its initial, uniformly oriented state. This process is normally completed in about 50 to 100 miliseconds, after which the visual image will have disappeared and the imaging chamber is ready for the next exposure. In the case of a single shot operation, a camera system synchronized with the x-ray exposure cycle may be used to record the image permanently. Real time or quasi-real time imaging may be obtained by repeating the exposure cycle at a frequency which would be limited by the switching times of the particular liquid crystal material utilized.

Liquid crystal materials have a relatively long life if they are operated in an ac mode, thus avoiding electrochemical decomposition of the material at the electrodes. Thus it is preferable to reverse the polarity of the imaging power supply after each exposure so that for one exposure electrons will enter the liquid crystal material from the plate 16 and for the next exposure electrons will move from the liquid crystal material to the plate. This may be achieved by having the power supply 25 and ac supply operating at a frequency half the x-ray exposure rate. A typical system may operate at ten exposures per second.

In an alternative embodiment, storage type dynamic scattering liquid crystal material may be utilized to preserve a single shot image for visual inspection and possible subsequent copying. The image of the storage type material may be erased by applying a short pulse of ac voltage, typically in the frequency range of a few kilohertz. In this configuration, the dc field is applied during the x-ray exposure to produce the image and the ac field is then applied to erase the image, as by closing switch 28 connecting the power supply 27 across the electrodes.

Figure 2:
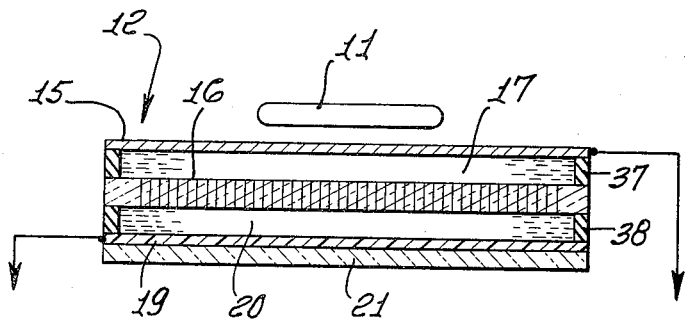
FIG. 2 is a view similar to that of FIG. 1 utilizing a liquid x-ray absorber.

An alternative embodiment of the imaging chamber of FIG. 1 is shown in FIG. 2, with corresponding elements identified by the same reference numerals. A liquid absorber is used in the gap 17 rather than a gas absorber and reference may be had to the aforesaid copending application Ser. No. 456,532 for more detailed information on the liquid absorber. The liquid absorber is an x-ray absorber and electron and positive ion emitter serving the same purpose as the gas absorber of the embodiment of FIG. 1, and comprises an x-ray opaque electrically non-conducting liquid having atoms with an atomic number of at least 17. The liquid absorber may be utilized at atmospheric pressure and therefore the high pressure housing and viewing port of the FIG. 1 are not required. The electrode 15 is spaced from the plate 16 by a frame member 37, and the plate 16 is spaced from the electrode 19 and substrate 21 by another frame member 38. The operation of the imaging chamber of FIG. 2 is the same as that of FIG. 1.

Figure 3:
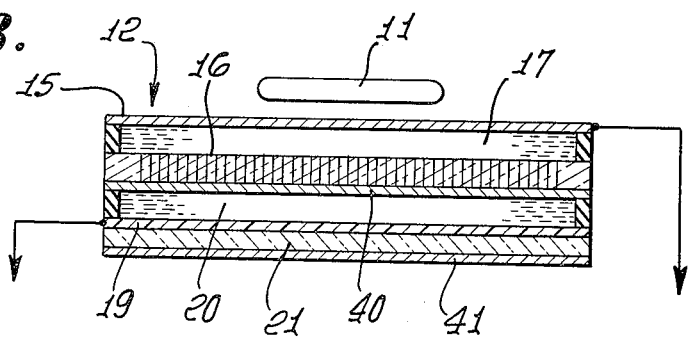
FIG. 3 is a view similar to that of FIG. 2 for a system with field effect type liquid crystal material rather than the dynamic scattering type material of FIGS. 1 and 2.

Another alternative embodiment for the imaging chamber is shown in FIG. 3, with elements corresponding to those of FIGS. 1 and 2 identified by the same reference numerals. In the embodiment of FIG. 3, a field effect type liquid crystal material is utilized in the gap 20. The field effect material does not require the passage of electricity through the material, rather depending upon the establishment of an electric field across the layer of material between the plate 16 and electrode 19. This field changes the local orientation of the liquid crystal molecules which may be rendered visible by utilizing polarized light techniques known to those working in the liquid crystal material field. In this embodiment, it is desirable to overlay the liquid crystal material side of the plate 16 with a thin electrical insulating film in order to avoid injection of electrons into the liquid crystal material. Such a film 40 may be of evaporated or sputtered silicon monoxide or dioxide or other suitable insulating material. Alternatively, it could consist of a broad band dielectric mirror, designed to reflect the visible spectrum. The film or layer 40 should be thin so that the electric field is not degraded by its presence. A circular polarizer sheet 41 is positioned at the viewing side of the substrate 21 for viewing the image through the polarizer sheet.

In normal operation, not all of the incident x-radiation in the gap 17 will be absorbed. It is desirable to shield the liquid crystal material from the unabsorbed radiation and this may be accomplished by suitable choice of materials for the plate 16. Typically, the glass insulating body may be constructed of a lead glass and the conductive pins of a metal which is highly absorbent of radiation.

We claim:

1. In an electronradiography imaging chamber providing a visual image suitable for direct viewing and/or copying, the combination of:
   a first electrode;
   an anisotropic conductive plate;
   a second transparent electrode;
   means for supporting said electrodes and plate in spaced relation with a first x-ray absorber gap between said first electrode and said plate and a second liquid crystal material gap between said plate and said second electrode;
   means for connecting a power source across said electrodes;
   an x-ray absorber and electron and positive ion emitter in said first gap for producing a charge image on said plate; and
   a liquid crystal material in said second gap, with said charge image transmitted through said plate towards said second electrode for modulating said material producing a visual image of said charge image.

2. A chamber as defined in claim 1 wherein said absorber and emitter is an x-ray opaque gas at super atmospheric pressure and having an atomic number of at least 36.

3. A chamber as defined in claim 1 wherein said absorber and emitter is an x-ray opaque electrically non-conducting liquid having atoms with an atomic number of at least 17.

4. A chamber as defined in claim 1 including a source of illumination directed towards said second electrode.

5. A chamber as defined in claim 1 wherein said liquid crystal material is dynamic scattering type material with the charge image on said plate producing electric current in said material between said plate and second electrode.

6. A chamber as defined in claim 1 wherein said liquid crystal material is field effect type material with the charge image on said plate producing an electric field in said material between said plate and second electrode.

7. A chamber as defined in claim 6 including an electrical insulating layer on said plate at said liquid crystal material.

8. A chamber as defined in claim 6 including:
a source of illumination directed towards said second electrode; and
a circular polariser sheet on the illuminated side of said second electrode.

9. A chamber as defined in claim 1 wherein said anisotropic plate comprises a plurality of electrical conducting pins spaced from each other in an electrical insulating support.

10. A chamber as defined in claim 1 including a dc power supply.

11. A chamber as defined in claim 1 including an ac power supply.

12. A chamber as defined in claim 1 including a first ac power supply operating at a lower frequency for forming an image and a second ac power supply operating at a higher frequency for erasing the image.

13. A chamber as defined in claim 1 including a dc power supply for forming an image and an ac power supply for erasing the image.

* * * * *